(12) United States Patent
    Chalaud

(10) Patent No.: US 10,934,889 B2
(45) Date of Patent: Mar. 2, 2021

(54) SYSTEM AND METHOD FOR SUPPLYING LUBRICATION FLUID TO AT LEAST ONE MEMBER OF AN AIRCRAFT PROPULSION ASSEMBLY

(71) Applicant: SAFRAN AIRCRAFT ENGINES, Paris (FR)

(72) Inventor: Sebastien Christophe Chalaud, Vincennes (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 457 days.

(21) Appl. No.: 15/775,653

(22) PCT Filed: Nov. 18, 2016

(86) PCT No.: PCT/FR2016/053018
    § 371 (c)(1),
    (2) Date: May 11, 2018

(87) PCT Pub. No.: WO2017/085430
    PCT Pub. Date: May 26, 2017

(65) Prior Publication Data
    US 2018/0371945 A1    Dec. 27, 2018

(30) Foreign Application Priority Data
    Nov. 19, 2015    (FR) ...................... 15 61151

(51) Int. Cl.
    *F01D 25/20*    (2006.01)
    *F16H 57/04*    (2010.01)
    (Continued)

(52) U.S. Cl.
    CPC ............... *F01D 25/20* (2013.01); *F02C 7/36* (2013.01); *F16H 57/0435* (2013.01);
    (Continued)

(58) Field of Classification Search
    CPC . F01D 25/20; F01D 25/18; F02C 7/36; F16H 57/0435; F16H 57/0436;
    (Continued)

(56) References Cited

U.S. PATENT DOCUMENTS 2,916,875 A    12/1959    Morley et al.
4,424,665 A *  1/1984    Guest ...................... F01D 25/20
                                                     184/6.11
(Continued)

FOREIGN PATENT DOCUMENTS

DE    43 04 482 A1    8/1994
EP    0 151 968 A2    8/1985
(Continued)

OTHER PUBLICATIONS

International Search Report dated Feb. 22, 2017 in PCT/FR2016/053018 filed Nov. 18, 2016.

*Primary Examiner* — Michael R Mansen
*Assistant Examiner* — Robert T Reese
(74) *Attorney, Agent, or Firm* — Oblon, McClelland, Maier & Neustadt, L.L.P.

(57) ABSTRACT

A feed system for feeding lubricating oil to members of a turbine engine including a reduction gearbox, the feed system including a nonpositive-displacement pump device for connecting upstream to an oil tank and driven in rotation at a speed that is not correlated with an operating speed of the turbine engine; a separator node connected to the outlet of the nonpositive-displacement pump device; a first delivery branch for lubricating the RGB connected to the nonpositive-displacement pump device via the separator node; a second delivery branch for lubricating other members connected to the nonpositive-displacement pump device via the separator node, the second delivery branch including a positive-displacement pump; and at least one fluid metering device having a metering slot fed by the nonpositive-
(Continued)

displacement pump device via the separator node for the purpose of feeding the RGB.

12 Claims, 1 Drawing Sheet

(51) Int. Cl.
    *F16N 7/38*     (2006.01)
    *F16N 13/22*     (2006.01)
    *F16N 13/20*     (2006.01)
    *F16N 25/00*     (2006.01)
    *F16N 19/00*     (2006.01)
    *F16N 27/00*     (2006.01)
    *F02C 7/36*     (2006.01)

(52) U.S. Cl.
    CPC ..... *F16H 57/0436* (2013.01); *F16H 57/0441* (2013.01); *F16H 57/0475* (2013.01); *F16N 7/38* (2013.01); *F16N 13/20* (2013.01); *F16N 13/22* (2013.01); *F16N 19/00* (2013.01); *F16N 25/00* (2013.01); *F16N 27/00* (2013.01); *F05D 2260/40* (2013.01); *F05D 2260/4031* (2013.01); *F05D 2260/98* (2013.01); *F05D 2270/20* (2013.01); *F16N 2210/02* (2013.01); *F16N 2210/08* (2013.01); *F16N 2210/12* (2013.01); *F16N 2250/08* (2013.01); *F16N 2250/40* (2013.01); *F16N 2270/70* (2013.01); *Y02T 50/60* (2013.01)

(58) Field of Classification Search
    CPC . F16N 7/38; F16N 13/20; F16N 13/22; F16N 25/00; F16N 27/00
    See application file for complete search history.

(56) References Cited

U.S. PATENT DOCUMENTS

| | | |
|---|---|---|
| 5,118,258 A | 6/1992 | Martin |
| 5,168,704 A | 12/1992 | Kast et al. |
| 2009/0078508 A1* | 3/2009 | DeLaloye ............... F01D 25/20 184/6.11 |
| 2009/0140182 A1* | 6/2009 | Agrawal ................... F02C 3/10 251/5 |
| 2011/0048856 A1* | 3/2011 | Thivierge ............ F16H 57/0406 184/6.11 |
| 2012/0122631 A1* | 5/2012 | Galivel ..................... F02C 7/32 477/15 |
| 2012/0266600 A1 | 10/2012 | Bader et al. |
| 2014/0260568 A1* | 9/2014 | Modzelewski .. G01N 33/48785 73/64.55 |
| 2016/0017812 A1* | 1/2016 | Sheridan ............... F16N 39/002 415/1 |
| 2016/0208651 A1* | 7/2016 | Dolman ............. F16H 57/0475 |
| 2016/0312699 A1* | 10/2016 | Teicholz ............ F16H 57/0435 |
| 2017/0051671 A1* | 2/2017 | Chalaud .................... F02C 9/36 |
| 2017/0198605 A1* | 7/2017 | Vielcanet .................. F16N 7/40 |
| 2017/0211477 A1* | 7/2017 | Menheere ................ F02C 7/36 |
| 2017/0364097 A1* | 12/2017 | Weber .................. F15B 13/043 |
| 2018/0073395 A1* | 3/2018 | Parnin ................ F16H 57/0442 |
| 2018/0283281 A1* | 10/2018 | Veilleux, Jr. ............ F01D 15/12 |

FOREIGN PATENT DOCUMENTS

| | | |
|---|---|---|
| EP | 0 474 585 A1 | 3/1992 |
| FR | 2 950 864 A1 | 4/2011 |
| FR | 3 020 403 A1 | 10/2015 |

* cited by examiner

SYSTEM AND METHOD FOR SUPPLYING LUBRICATION FLUID TO AT LEAST ONE MEMBER OF AN AIRCRAFT PROPULSION ASSEMBLY

BACKGROUND OF THE INVENTION

The invention relates to a system for feeding lubricating fluid to at least one member of an aircraft engine.

New aircraft engine architectures, such as for example ultra-high-bypass ratio (UHBR) architectures, or architectures with a fan that is not ducted known as an "open rotor", or indeed the latest generations of turboprops, are making more and more use of reduction gear boxes (RGBs) that require considerable lubrication, which can be particularly constraining and which also gives rise to large amounts of power being dissipated in the oil.

Dissipating this power contained in the oil poses a major problem.

Two cold sources are available on the engine: fuel; and air. It is generally preferred to discharge heat into the fuel in order to recover a maximum amount of energy prior to combustion, with the additional power then being dissipated into the air.

Air/oil heat exchangers that enable heat to be dissipated from the oil to the air, also reduce the performance of the engine. It is therefore better for the engine to reduce as much as possible the amount of power that is dissipated in the oil.

The RGBs used in UHBR, turboprop, or open rotor type applications serve to reduce a speed of rotation between an inlet shaft and an outlet shaft. The power levels involved are enormous since they can reach several tens of megawatts, and losses, even when reduced to a minimum, can reach several tens or even hundreds of kilowatts. These losses thus represent the major contribution in terms of the amount of power dissipated in the oil.

RGBs are sensitive to the flow rate at which they receive oil. Specifically, depending on the speed of rotation of the inlet shaft and on the torque involved, the optimum oil flow rate varies. Departing from the optimum oil flow rate reduces the efficiency of the RGB and consequently increases the losses that need subsequently to be dissipated. In certain stages of flight, departing from that flow rate can even damage the RGB.

For the various reasons mentioned above, it is advantageous to be able to regulate the rate at which oil is fed to the RGB.

Nevertheless, managing the oil flow rate, and in particular the flow rate fed to the RGB, is difficult to achieve in satisfactory manner during all stages of flight.

Known devices and methods already exist for regulating the flow rate of fluid delivered by a pump system, where the fluid may be fuel for feeding to the turbine engine or oil for feeding in particular to an RGB.

The operation of such devices generally relies on a feed flow rate that depends on the speed of the engine, being generated by a positive-displacement pump typically driven in rotation from a turbine shaft of the engine. Since the flow rate generated by a positive-displacement pump is constant for a given engine speed, it is associated with a mechanical metering system at its outlet, e.g. a metering slot, thus making it possible to meter the necessary flow rate.

Nevertheless, in that type of known system, in order to achieve good metering using a mechanical metering system, the positive-displacement pump needs to be driven so as to pump a flow rate that is greater than the necessary flow rate, thereby taking off too much power from the engine compared with requirements. Consequently, the system needs to provide a recirculation circuit for the excess flow delivered by the positive-displacement pump.

The fluid thus directed to the recirculation circuit becomes heated under the influence of a large pressure difference, and it generates heat losses that need to be dissipated.

That type of system using a positive-displacement pump is therefore not optimized.

Fluid feed systems are also known, in particular from Document FR 2 882 095, that conventionally make use of a centrifugal pump driven by a drive shaft of the turbine engine such that the speed of rotation presents a constant linear correlation with the speed of the engine.

Nevertheless, in that type of known system, it is difficult, when the turbine engine is operating at low speed, to ensure the minimum pressure level that is needed for fluid to circulate. The need to provide some minimum level of pressure at low speed generally leads to the pump of the feed system being overdimensioned.

Furthermore, systems are known that operate with a flow rate that is independent of the speed of the turbine engine.

For example, a fuel and oil pump assembly is known having a series of pumps driven by a shaft of an electric motor under the control of a controller. The fuel and lubricant feeds delivered by the pump assembly are thus not tied to the turbine engine speed. Since the fuel and oil positive-displacement pumps are driven by a common shaft, provision is made for them to be variable displacement pumps that are controlled independently by the controller so as to decorrelate the fuel and oil flow rates delivered to the engine.

A pump assembly is also known for fuel that comprises in particular a positive-displacement pump driven by an electric motor that is independent of the accessory gearbox, and thus of the engine speed, such that the flow rate delivered by the pump is controlled by regulating the speed of the electric motor.

Nevertheless, such systems without a metering device and based on electrically driving positive-displacement pumps of constant or variable displacement generally present a high degree of complexity, or require the regulation and the tolerances of the pump to be sufficiently fine and well-controlled in order to provide accurate metering.

OBJECT AND SUMMARY OF THE INVENTION

The invention seeks to provide a feed system for feeding lubricating fluid, referred to generically as lubricating oil, to at least one member of an aeroengine, the system enabling lubricating oil to be delivered at a controlled rate, but without overdimensioning the pump of the feed system and without recirculating the pumped fluid, which generally gives rise to undesirable heating.

The invention provides a feed system for feeding lubricating oil to members of a turbine engine, including a reduction gearbox (RGB). The feed system comprises:
  a nonpositive-displacement pump device for having its inlet connected to an oil tank and driven in rotation at a speed that is not correlated with an operating speed of the turbine engine, the nonpositive-displacement pump device (2) comprising a nonpositive-displacement pump or at least two nonpositive-displacement pumps connected in a series fluid-flow connection;
  a separator node connected to the outlet of the nonpositive-displacement pump device;

a first delivery branch for lubricating at least the RGB, which branch is connected to said nonpositive-displacement pump device via the separator node;

a second delivery branch for lubricating other members, connected to the nonpositive-displacement pump device via the separator node, the second delivery branch including a positive-displacement pump; and at least one fluid metering device having a metering slot fed by the nonpositive-displacement pump via the separator node for the purpose of feeding the RGB.

Hydraulic pumps come in two categories: positive-displacement pumps that are to be found in most fluid feed systems, and nonpositive-displacement pumps in which the outlet pressure is generated by the kinetic energy of the fluid set into motion by the pump.

Unlike a positive-displacement pump that imposes an outlet flow rate, a nonpositive-displacement pump serves to impose an outlet pressure. In the present invention, the metering device connected downstream from the nonpositive-displacement pump serves to control the flow rate. Specifically, the pressure upstream from the metering device is imposed by the centrifugal pump, and in the application to lubricating an RGB, the pressure downstream is imposed by the pressure inside the gearbox and by the head losses in the injector nozzles. The pressure difference across the metering device is variable but can be known, e.g. by modeling the downstream pressure as a function of stages of flight. The flow rate is thus controlled by controlling the flow section through the metering device in the knowledge of the pressure difference across the metering device.

Associating the fluid metering device with the nonpositive-displacement pump thus serves to adapt the flow rate of fluid downstream from the metering device without having recourse to a fluid recirculation circuit connecting the outlet of the pump to its inlet, and without risk of damaging the pump.

The use of the fluid metering device makes it possible to avoid any direct mechanical action on the pump, in particular unlike feed systems that make use of positive-displacement pumps of variable displacement, thus making it possible to avoid any impact relating to its reliability.

Furthermore, the outlet flow rate from the nonpositive-displacement pump always corresponds to the fluid requirements downstream, which makes it possible to provide a system that is optimized in terms of the power to be delivered to the pump. In particular, when the downstream requirements are those for feeding oil to an RGB, there is no loss of power that might otherwise be caused by churning as a result of excess oil being delivered to the RGB.

In addition, since the pump is not correlated with the speed of the turbine engine, the feed system can act at very low speeds to deliver a flow to a member such as an RGB, and can do so in particular during a stage of "windmilling".

Feeding a positive-displacement pump by using a nonpositive-displacement pump makes it possible to ensure a good boost pressure for the positive-displacement pump, and thus to ensure that it performs well. This also makes it possible to reduce the power that the positive-displacement pump needs to deliver.

Thus, since the oil pressure at the inlet to the positive-displacement pump is increased because the positive-displacement pump is boosted by the nonpositive-displacement pump, the efficiency of the positive-displacement pump is improved. The positive-displacement pump may be designed to be smaller and its speed of operation may be increased, in order to deliver the required flow rate and pressure to the other members for lubricating. This makes it possible to achieve a saving in space and weight for the feed device, in spite of the fact that the axial size and the weight of the nonpositive-displacement pump may be increased a little in order to pass a greater flow rate. For example, the rotor blades of the nonpositive-displacement pump may be designed to be axially a little longer in order to pass the maximum required flow rate.

Furthermore, because the positive-displacement pump is boosted by the nonpositive-displacement pump, the oil pressure at the inlet to the positive-displacement pump is always sufficient to avoid any risk of cavitation. There is therefore no need to pressurize the oil tank, since the pressure of oil at the inlet to the nonpositive-displacement pump may be equal or close to atmospheric pressure. This means that the oil tank can be designed to be of lower strength, and thus to be lighter in weight. Furthermore, the lower pressure in the oil tank improves the efficiency of the oil recovery pumps that return oil from the system to the tank, thereby making it possible to adopt oil recovery pumps that are somewhat more compact and lighter in weight. The efficiency, the size, and the weight of the feed system as a whole are thus optimized.

In a first aspect of the fluid feed system, the system may further comprise a drive device for driving the positive-displacement pump device in rotation at constant speed.

Constant speed drive serves to reduce the electronics needed for controlling the system.

Furthermore, choosing constant speed drive that is not correlated with the operating speed of the turbine engine makes it possible to avoid drawbacks when operating a variable speed pump at low speed.

Specifically, if the pump were to operate at a variable speed with a constant linear correlation with the speed of the turbine engine, e.g. by being mechanically connected to one of the drive shafts as is conventionally done, then a nonpositive-displacement pump would deliver too little pressure at low speed, as can happen during windmilling of the engine or while it is idling. It would then be necessary to increase the radius of the pump in order to obtain sufficient pressure. At high speed, in particular during stages of takeoff or cruising, the pump would then deliver to the fluid much more pressure than is needed, given that pressure varies with the square of speed. Too much power would then be taken from the engine and the oil would be at too great a pressure, which is also troublesome.

In a second aspect of the fluid feed system, the fluid system may further comprise a drive device for driving the positive-displacement pump device at a speed of rotation that can vary between a minimum speed and a maximum speed, said maximum speed being not less than 1.2 times the minimum speed and not greater than twice the minimum speed.

For a variable speed rotary device, the device for driving the nonpositive-displacement pump device in rotation may comprise a drive shaft coupled to a turbine shaft of the turbine engine via an automatic gearbox having a plurality of transmission ratios, in particular in order to increase the speed of rotation of the pump, and thus its flow rate, at low engine speed. It is possible to envisage using a transmission ratio changer device as described in WO 2011/061438.

In a third aspect of the fluid feed system, the device for driving the nonpositive-displacement pump device in rotation may comprise a pneumatic actuator. By way of example, the pneumatic actuator may operate by taking air from a compressor of the engine.

In a fourth aspect of the fluid feed system, the device for driving the nonpositive-displacement pump device in rotation may comprise an electric motor, independent of the turbine engine.

In a fifth aspect of the fluid feed system, the feed system may further comprise a monitor device for monitoring the fluid flow rate delivered at the outlet from the fluid metering device.

Preferably, the monitor device for monitoring the fluid flow rate comprises a measurement sensor for measuring the pressure difference between the upstream and downstream sides of the fluid metering device, said measurement sensor being coupled to a sensor for sensing the position of a movable member for controlling the flow section of the metering slot of the fluid metering device.

The relationship for hydraulic flow through a section is written as follows:

$$Q = K_S \sqrt{\Delta P}$$

where Q is the flow rate going through the section, ΔP is the pressure difference across the section, and $K_S$ is a coefficient that is proportional to the flow section. Thus, if the pressure difference ΔP across the section is known together with the flow area through the section, then the flow rate can be deduced.

In a variant, the fluid flow monitor device may comprise a flow meter arranged downstream from the fluid metering device.

A flow meter is very accurate under steady conditions and less accurate under transient conditions. However, it is particularly during steady conditions that fluid metering needs to be accurate since that is when the thermal aspect is important. Furthermore, during transients, it is possible to regulate the movement of the fluid metering slot in order to obtain fluid metering by using a model for head losses in the fluid circuit, which model can be reset under steady conditions.

The solution with a pressure sensor serves to avoid having a flow meter and provides better accuracy, but is more complex and more expensive than the solution with a flow meter.

In a sixth aspect of the fluid feed system, the nonpositive-displacement pump device may comprise at least one centrifugal pump.

The most common nonpositive-displacement pumps are centrifugal pumps. A centrifugal pump operates on the principle of the centrifugal force that is applied to the fluid that is driven in rotation inside the pump. It serves to raise the pressure of the fluid as a function of the square of the radius of the pump and as a function of the square speed of rotation.

In a seventh aspect of the fluid feed system, the first delivery branch between the separator node and the RGB preferably does not have a fluid recirculation loop, such that all of the fluid downstream from the separator node can be used for feeding the RGB.

In an eighth aspect of the fluid feed system, the first delivery branch comprises a plurality of ramifications, each for connecting the outlet of the pump device to at least one of said members for lubricating, including the RGB, at least two of the ramifications each including a fluid metering device connected between the pump device and the member connected to the ramification, the fluid metering device of each ramification being actuatable independently of the metering devices of the other ramifications.

This configuration thus provides a fluid feed system comprising a nonpositive-displacement pump that is common to a plurality of feeds and a fluid metering device that is specific to each member or group of members that is to have a regulated flow rate. The members may comprise one or more electricity generators.

This configuration provides a large saving in oil for the generators since need is completely uncorrelated with engine speed, unlike the flow rate delivered by a positive-displacement pump, which flow rate depends on engine speed.

The invention also provides a method of utilizing the above-defined feed system for feeding lubricating oil to a reduction gearbox of a turbine engine, the method comprising a step of regulating the lubricating oil flow rate by controlling the fluid metering means, and more particularly by controlling the position of a movable member for controlling the flow rate of the fluid metering device.

In a first aspect of the method of utilizing the oil feed system, the method comprises a step of measuring the temperature of the lubricating oil, and if the measured temperature is below a threshold temperature, a step of heating the lubricating oil by moving the movable member of the fluid metering device into a position that is excessively open so as to increase the flow rate of lubricating oil that is pumped.

The invention also provides an aircraft propulsion assembly comprising a feed system as defined above for feeding lubricating oil to a turbine engine reduction gearbox.

BRIEF DESCRIPTION OF THE DRAWING

The invention can be better understood on reading the following description given by way of non-limiting indication and with reference to the accompanying drawing, in which.

DETAILED DESCRIPTION OF EMBODIMENTS

Figure 1:
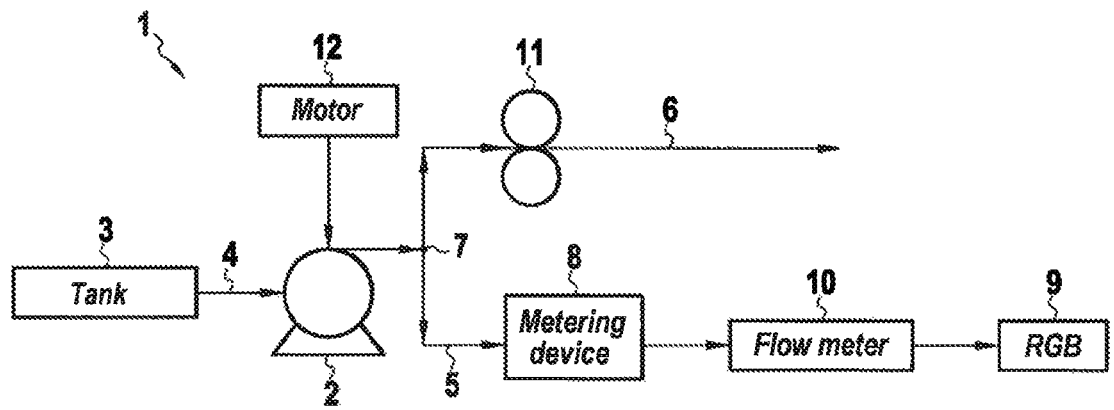
FIG. 1 is a diagram of a fluid feed system in a first embodiment.

FIG. 1 is a diagram of a first embodiment of an oil feed system 1 for a reduction gearbox (RGB) of an aeroengine that comprises a turbine engine.

In the embodiment shown in FIG. 1, the feed system 1 comprises a centrifugal pump 2 having its inlet connected to a fuel tank 3 via a feed branch 4 of the centrifugal pump 2, and two delivery branches 5 and 6 connected to the outlet of the centrifugal pump 2 via a separator node 7.

The first delivery branch 5 includes fluid metering device 8 with a metering slot connected to an RGB 9 via a flow meter 10.

The oil metering device 8 with a metering slot is itself known. By way of example, it may be in the form of a slide and a sheath typically used for metering fuel, as mentioned in Document FR 2 950 864. The controlled movement of the slide in the sheath or bushing masks the slot to a greater or lesser extent. The uncovered section of the slot through which the fluid passes is thus controlled depending on the desired flow rate. Movement of the slide in the metering device is driven by a servo-valve type member, for example.

In this example, the flow meter 10 is used to provide proper metering at the outlet from the oil metering device 8.

In the example shown, the second delivery branch 6 includes a positive-displacement pump 11 connected at its outlet to other members of the turbine engine (not shown).

The feed system 1 thus delivers oil to various members of the propulsion assembly of the aircraft. Upstream from the centrifugal pump 2, the oil comes from the oil tank 3. The centrifugal pump 2 then serves to raise the pressure of the oil and it adapts to the flow rate needed.

Because the positive-displacement pump is boosted by the nonpositive-displacement pump, there is no need to pressurize the oil tank. The oil pressure at the inlet to the nonpositive-displacement pump may specifically equal or close to atmospheric pressure. In certain configurations, it can nevertheless be useful to pressurize the tank.

The centrifugal pump 2 is driven in rotation at a speed that is not correlated with the operating speed of the turbine engine.

In the example shown in FIG. 1, the centrifugal pump 2 is driven at a constant speed by an electric motor 12 that is independent of the speed of the turbine engine.

By setting a target pressure increase, e.g. 10 bars, and by setting a speed of rotation, e.g. 10,000 revolutions per minute (rpm), it is possible to deduce the radius that the centrifugal pump needs to have. Thus, during all stages of flight, and knowing the temperature of the oil, the pressure downstream from the centrifugal pump is known.

With the centrifugal pump 2 delivering oil at a given pressure, oil is available under pressure upstream from the oil metering device 8 having a metering slot, and its flow rate is still not imposed at this moment.

It is the metering slot of the oil metering device 8 that regulates the flow rate.

As mentioned above, the relationship for hydraulic flow through a section is written as follows:

$$Q = K_S \sqrt{\Delta P}$$

The pressure upstream from the slot of the oil metering device 8 is imposed by the centrifugal pump 2, and the pressure downstream is imposed by the pressure in the inside of the RGB 9 and by the head loss through injector nozzles (not shown).

The pressure difference $\Delta P$ across the terminals of the slot in the oil metering device 8 is thus variable and depends on the flow rate into the inside of the RGB 9, and can therefore be modeled in order to manage transient stages.

The pressure downstream from the slot of the oil metering device 8 is the sum of the pressure inside of the RGB 9, which depends on the operating point in the flight envelope, and on the head losses through the nozzles, which depends on the flow rate delivered to the inside of the RGB 9. The sum of these two pressures serves to model the pressure downstream at any operating point in the flight envelope and during all stages of operation, which is very useful for transient stages.

From the resulting model for the pressure difference $\Delta P$, it is possible to control the movement of the slot via an open loop in order to increase or decrease the flow rate. The information delivered by the flow meter 10 serves both to reset the model during a transient stage, and also, and above all, to provide regulation during a stabilized stage of flight or during stages that are only slightly transient. If the model is sufficiently accurate, it is possible to use it during stabilized flight while omitting the flow meter.

Figure 2:
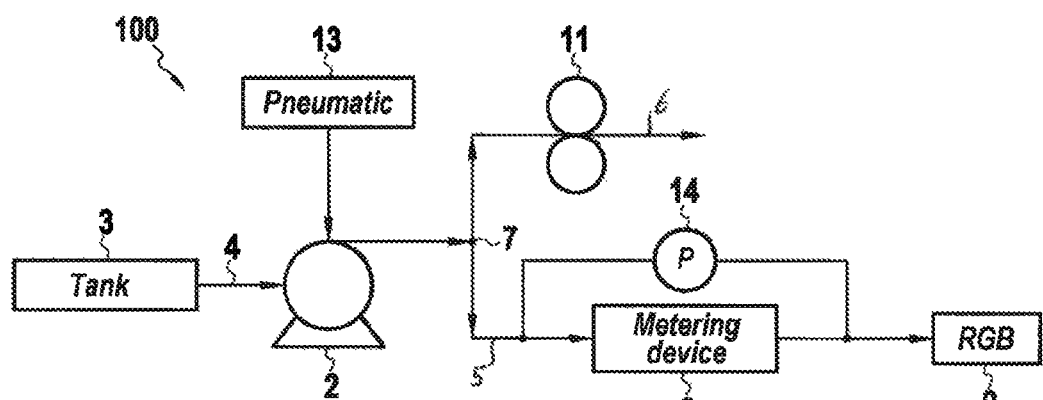
FIG. 2 is a diagram of a fluid feed system in a second embodiment.

FIG. 2 is a diagram of a second embodiment of an oil feed system 100 for an RGB of an aeroengine comprising a turbine engine.

Elements that are identical to the feed system 1 of FIG. 1 are given the same numerical references.

The feed system 100 of the second embodiment differs from the first embodiment in that the centrifugal pump 2 is driven at a variable speed by a pneumatic drive 13 operating on air taken from a compressor of the engine.

The pneumatic drive 13 is configured so that the drive speed range of the centrifugal pump 2 lies within a range defined relative to a minimum speed. The operating range is defined so that the operating speed lies in the range 1.2 times the minimum speed and twice the minimum speed.

The feed system 100 of the second embodiment also differs from the first embodiment in that the flow meter is replaced by a pressure sensor 14 connected between the inlet and the outlet of the oil metering device 8. Such a configuration is independent of the type of drive of the centrifugal pump 2 and is therefore equally applicable to the feed system 1 of the first embodiment.

Figure 3:
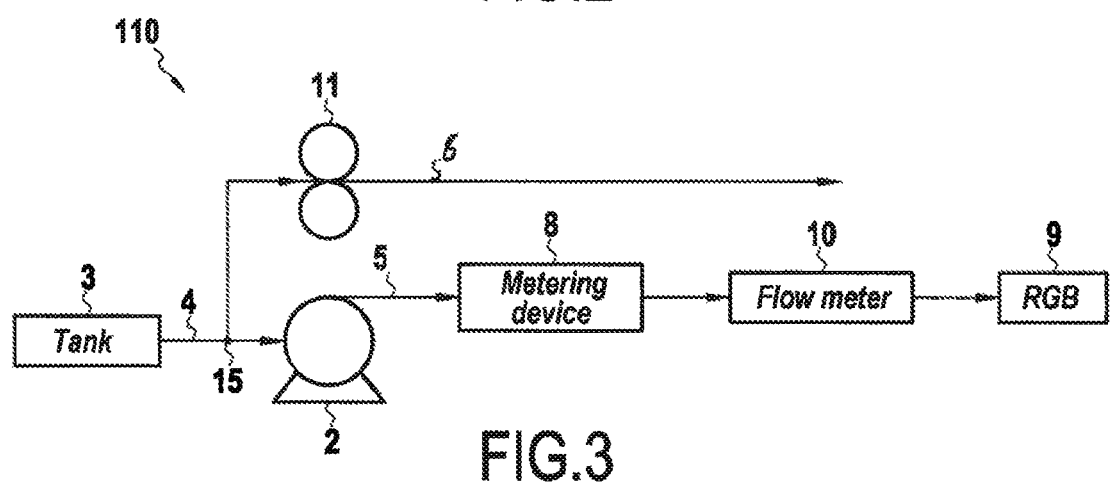
FIG. 3 is a diagram of a fluid feed system in a third embodiment.

FIG. 3 is a diagram showing a third embodiment of a system 110 for feeding oil to an RGB of an aeroengine comprising a turbine engine.

Elements that are identical with the feed system 1 of FIG. 1 are given the same numerical references.

This third embodiment differs from the first embodiment in that it does not have a separator node at the outlet from the centrifugal pump 2 since there is only the first branch 5 connected to the outlet of the centrifugal pump 2, with the second branch 6 having the positive-displacement pump 11 being connected directly to the tank via a separator node 15 provided in the feed branch 4. The oil tank 3 generally needs to be pressurized so as to ensure there is sufficient oil pressure at the inlet to the positive-displacement pump 11, in particular in order to avoid any risk of cavitation in the pump 11.

In a utilization of an oil feed system of the invention, that can be applied to any embodiment of the feed system, provision may be made in the event of the feed system being used in a low temperature environment for the oil metering device 8 to be opened in such a manner as to force a large flow rate to flow through the feed system in order to heat the oil. For this purpose, the oil metering device is caused to open excessively so as to increase the pump flow rate above the normal flow rate setpoint as calculated for higher temperatures. This leads to recirculation or churning of the oil in the RGB 9, thus serving to heat the oil.

Furthermore, the above description relates to a nonpositive-displacement pump device having only a single nonpositive-displacement pump 2 feeding the fluid metering device having a metering slot. In another alternative, instead of a single pump, there may be provided two nonpositive-displacement pumps that are connected in a series fluid-flow connection in order to constitute the nonpositive-displacement pump device. These nonpositive-displacement pumps in series may be driven in rotation by a common drive device, or by independent drive devices.

The feed system thus provides a solution that adapts to a flow rate requirement that varies during a flight of an aircraft. In particular, compared with prior art systems, the system serves to minimize energy losses and to manage feed at very low speeds without being overdimensioned at high speeds. Furthermore, the relative simplicity of the system makes it possible to achieve savings in size and weight.

The invention claimed is:

1. A feed system for feeding lubricating oil to members of a turbine engine including a reduction gearbox (RGB), the feed system comprising:

a nonpositive-displacement pump device for having an inlet connected to an oil tank and driven in rotation at a speed that is not correlated with an operating speed of the turbine engine, and comprising a nonpositive-displacement pump or at least two nonpositive-displacement pumps connected in a series fluid-flow connection;

a separator node connected to the outlet of the nonpositive-displacement pump device;

a first delivery branch for lubricating at least the RGB, which branch is connected to said nonpositive-displacement pump device via the separator node;

a second delivery branch for lubricating other members, which branch is connected to said nonpositive-displacement pump device via the separator node and includes a positive-displacement pump; and at least one fluid metering device having a metering slot and fed by the nonpositive-displacement pump device via the separator node for the purpose of feeding the RGB.

2. The feed system according to claim 1, further comprising a drive device for driving the positive-displacement pump device in rotation at constant speed.

3. The feed system according to claim 2, wherein the device for driving the nonpositive-displacement pump device in rotation comprises a pneumatic actuator.

4. The feed system according to claim 2, wherein the device for driving the nonpositive-displacement pump device in rotation comprises an electric motor.

5. The feed system according to claim 1, further comprising a drive device for driving the positive-displacement pump device at a speed of rotation that can vary between a minimum speed and a maximum speed, said maximum speed being not less than 1.2 times the minimum speed and not greater than twice the minimum speed.

6. The feed system according to claim 5, wherein the device for driving the nonpositive-displacement pump device in rotation comprises a drive shaft coupled to a turbine shaft of the turbine engine via an automatic gearbox having a plurality of transmission ratios.

7. The feed system according to claim 1, further comprising a monitor device for monitoring the fluid flow rate delivered at the outlet from the fluid metering device.

8. The feed system according to claim 7, wherein the monitor device for monitoring the fluid flow rate comprises a measurement sensor for measuring the pressure difference between the upstream and downstream sides of the fluid metering device, said measurement sensor being coupled to a sensor for sensing the position of a movable member for controlling the flow section of the metering slot of the fluid metering device.

9. The feed system according to claim 1, wherein said nonpositive-displacement pump device comprises at least one centrifugal pump.

10. The feed system according to claim 1, wherein the first delivery branch between the separator node and the RGB does not have a fluid recirculation loop.

11. A method of using the feed system according to claim 1, the method comprising a step of regulating the flow rate of the lubricating oil by controlling the position of the movable member for controlling the flow section of the fluid metering device.

12. An aircraft propulsion assembly including a feed system according to claim 1, for feeding lubricating oil to a reduction gearbox of a turbine engine.

* * * * *